United States Patent
Ikeda et al.

(10) Patent No.: US 9,499,032 B2
(45) Date of Patent: Nov. 22, 2016

(54) VEHICLE BACK DOOR STRUCTURE

(71) Applicant: TOYOTA JIDOSHA KABUSHIKI KAISHA, Toyota-shi, Aichi-ken (JP)

(72) Inventors: Koki Ikeda, Toyota (JP); Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/953,191

(22) Filed: Nov. 27, 2015

(65) Prior Publication Data

US 2016/0152121 A1 Jun. 2, 2016

(30) Foreign Application Priority Data

Dec. 2, 2014 (JP) .................................. 2014-243712

(51) Int. Cl.
*B60J 5/10* (2006.01)

(52) U.S. Cl.
CPC .................. *B60J 5/107* (2013.01); *B60J 5/101* (2013.01)

(58) Field of Classification Search
CPC ........................................................ B60J 5/107
USPC ........................................................ 296/56
See application file for complete search history.

(56) References Cited

U.S. PATENT DOCUMENTS

| | | | |
|---|---|---|---|
| 2003/0107235 A1* | 6/2003 | Komatsu et al. | 296/146.5 |
| 2003/0110705 A1* | 6/2003 | Hlavach et al. | 49/501 |
| 2003/0173796 A1* | 9/2003 | Harima et al. | 296/146.7 |
| 2010/0019522 A1* | 1/2010 | Nakamura | 296/50 |
| 2012/0280533 A1* | 11/2012 | Gachter et al. | 296/146.8 |
| 2013/0280452 A1* | 10/2013 | Nawroth et al. | 428/35.7 |
| 2014/0167446 A1* | 6/2014 | Iwano et al. | 296/146.8 |
| 2015/0210147 A1* | 7/2015 | Kodama | |
| 2015/0239400 A1* | 8/2015 | Tanaka et al. | |

FOREIGN PATENT DOCUMENTS

| | | |
|---|---|---|
| JP | 2011-057188 A | 3/2011 |
| JP | 2011-136606 A | 7/2011 |
| WO | WO 03092984 A1 * | 11/2003 |

* cited by examiner

Primary Examiner — Jerry Redman
(74) Attorney, Agent, or Firm — Oliff PLC

(57) ABSTRACT

A vehicle back door structure including: a back door panel made of resin having, in at least a part of a peripheral edge thereof, a recessed portion equipped with a pair of side walls and a bottom wall that interconnects vehicle front sides of the pair of side walls, with a step portion, that has one side-wall side positioned at a vehicle rear side of another side-wall side, being formed in the bottom wall; and a reinforcement rib that is formed integrally with a vehicle rear side surface of the bottom wall, that straddles the step portion, and that bridges the pair of side walls.

4 Claims, 4 Drawing Sheets

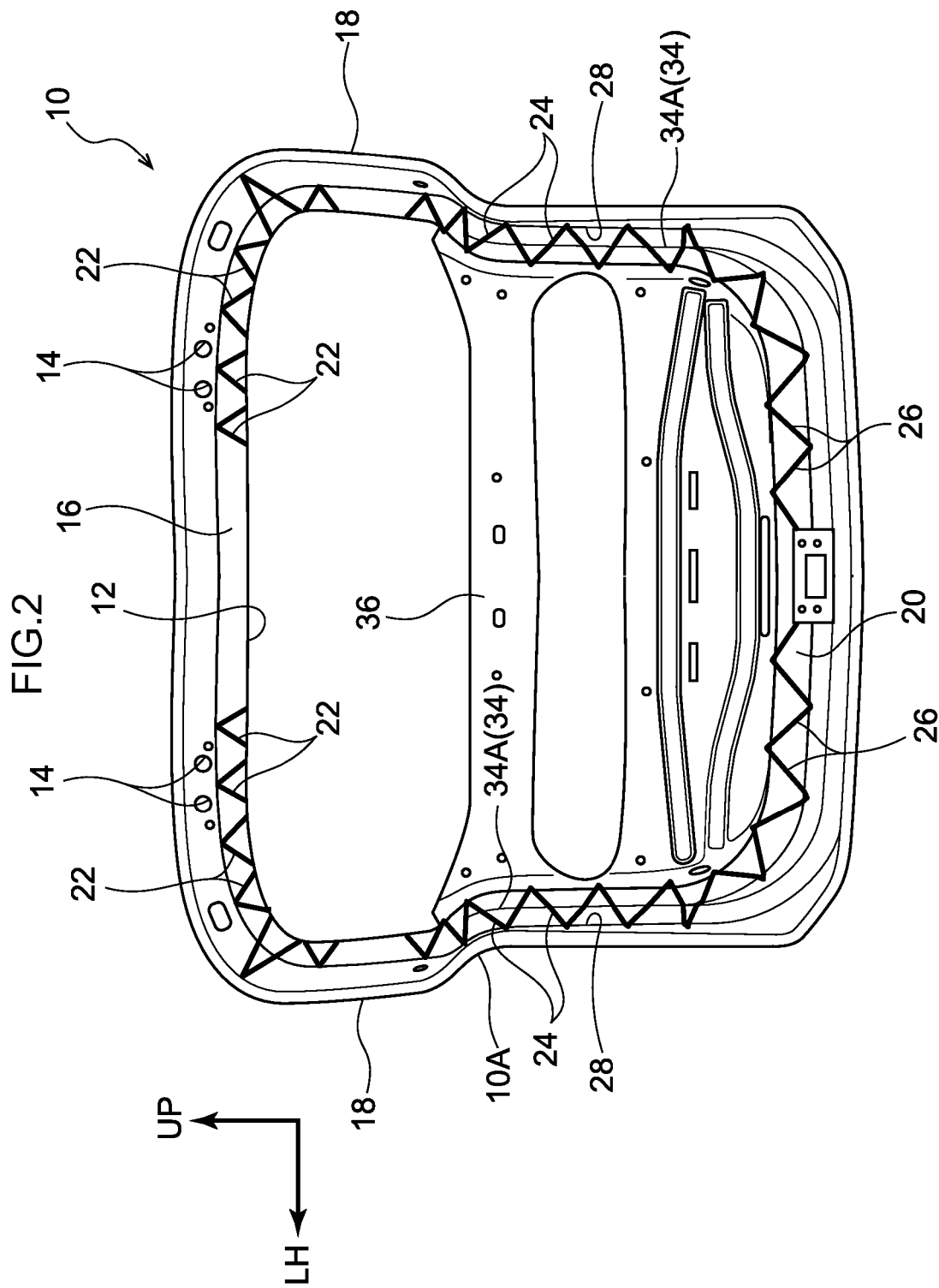

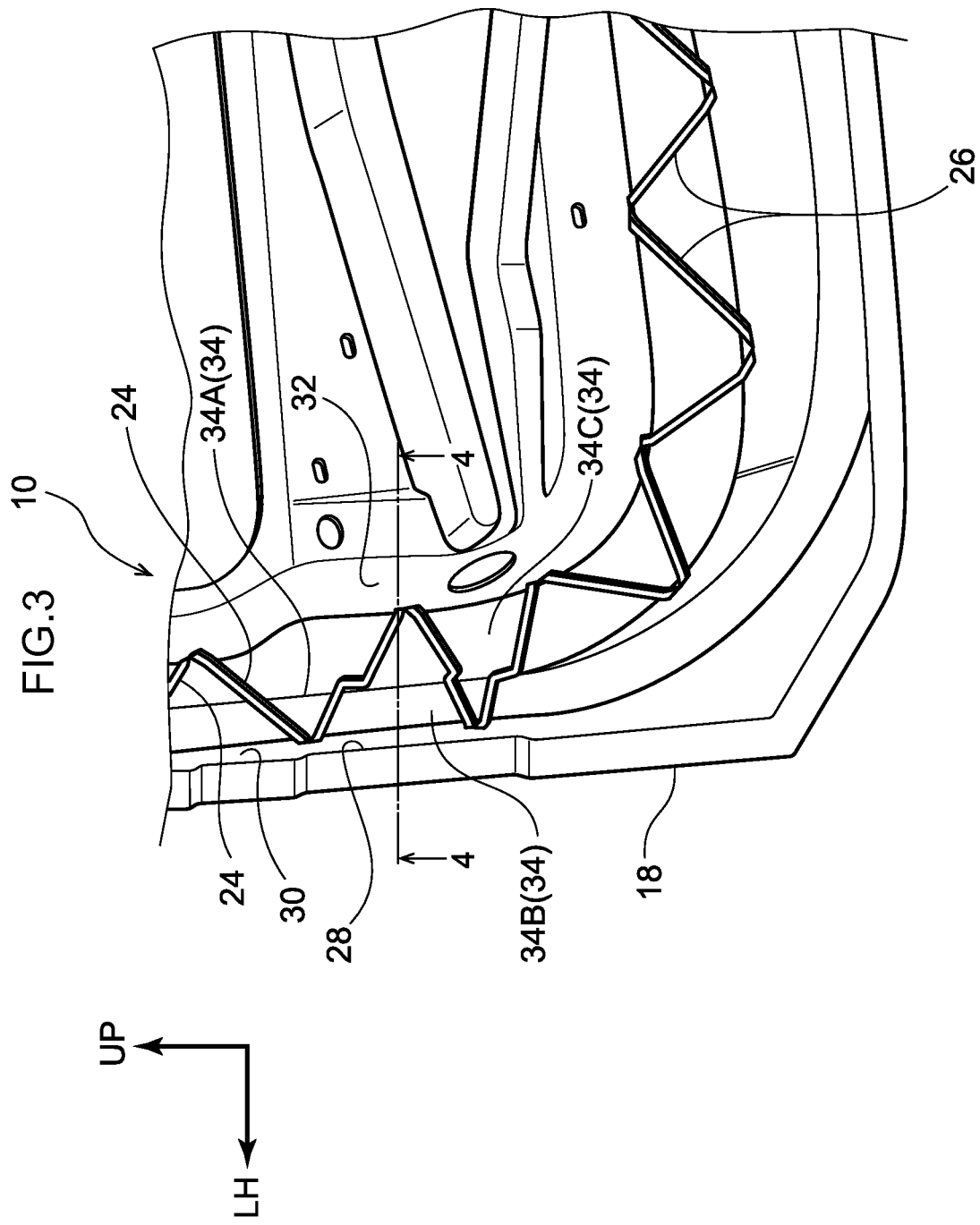

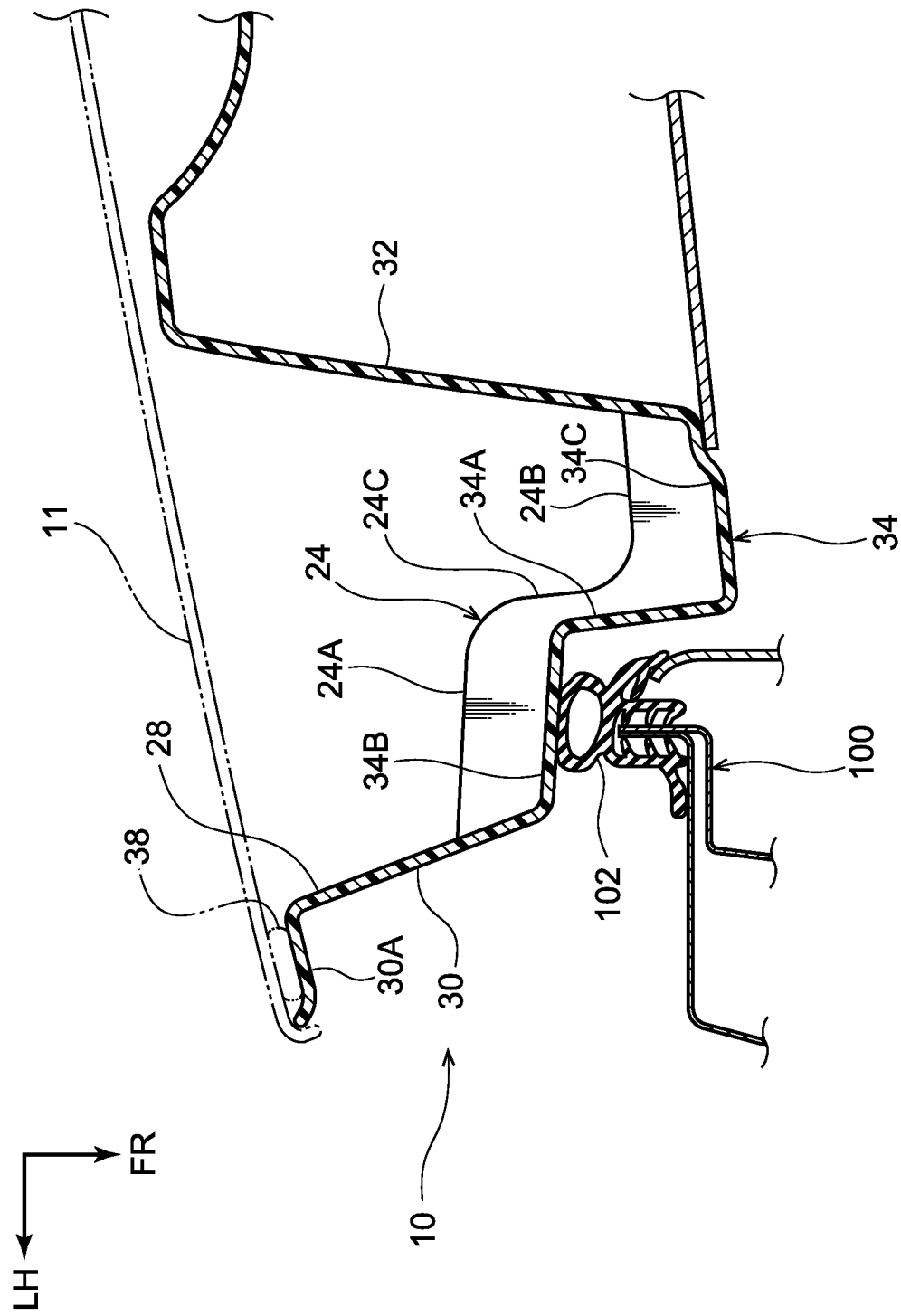

VEHICLE BACK DOOR STRUCTURE

CROSS-REFERENCE TO RELATED APPLICATION

This application is based on and claims priority under 35 USC 119 from Japanese Patent Application No. 2014-243712 filed on Dec. 2, 2014, the disclosure of which is incorporated by reference herein.

BACKGROUND

1. Technical Field

The present invention relates to a vehicle back door structure.

2. Related Art

As a vehicle back door structure made of resin, Japanese Patent Application Laid-open (JP-A) No. 2011-136606 discloses a back door structure where a hinge reinforcement made of metal is disposed between an outer panel made of resin and an inner panel made of resin. Here, because the outer panel and the inner panel are formed of resin, a reduction in the weight of the back door is achieved. Furthermore, because the hinge reinforcement made of metal is placed on the peripheral edge of the back door, deformation caused by a load acting from a weatherstrip or a damper, for example, is controlled.

However, in a structure disposed with a reinforcement member made of metal like in JP-A No. 2011-136606, the weight of the back door increases over a case where the back door is reinforced with a part made of resin, so there is room for improvement from the standpoint of ensuring the rigidity of the back door while at the same time achieving a reduction in weight.

SUMMARY

In consideration of the above circumstances, it is an object of the present invention to obtain a vehicle back door structure that can ensure the rigidity of a back door while at the same time achieving a reduction in weight.

A vehicle back door structure of a first aspect of the present invention has: a back door panel made of resin having, in at least a part of a peripheral edge thereof, a recessed portion equipped with a pair of side walls and a bottom wall that interconnects vehicle front sides of the pair of side walls, with a step portion that has one side-wall side positioned at a vehicle rear side of another side-wall side, being formed in the bottom wall; and a reinforcement rib that is formed integrally with a vehicle rear side surface of the bottom wall, that straddles the step portion, and that bridges the pair of side walls.

In the vehicle back door structure of the first aspect of the present invention, the recessed portion is formed in at least part of the peripheral edge of the back door panel made of resin. The recessed portion is equipped with the pair of side walls and the bottom wall that interconnects the vehicle front sides of the pair of side walls. Furthermore, the step portion that has one side wall side positioned on the vehicle rear side of the other side wall side is formed in the bottom wall. Moreover, the reinforcement rib is formed integrally with the bottom wall on the vehicle rear side surface of the bottom wall. Here, the reinforcement rib straddles the step portion of the bottom wall and bridges the pair of side walls. Because of this, the rigidity of the peripheral edge of the back door panel can be ensured, and even in a case where a load acts on the back door panel from a weatherstrip or a damper, for example, deformation of the back door panel can be controlled.

Furthermore, when molding the back door panel, the reinforcement rib bridging the pair of side walls supports and pushes back against the side walls, so the back door panel can be kept from becoming deformed when it thermally contracts. Moreover, because the reinforcement rib is formed of resin integrally with the bottom wall (the back door panel), a reduction in weight can be achieved compared to a configuration disposed with a reinforcement member made of metal and the number of parts can be reduced.

A vehicle back door structure of a second aspect of the present invention is the vehicle back door structure of the first aspect, wherein the reinforcement rib is configured to include a first rib portion that extends from one of the side walls toward the step portion, a second rib portion that extends from another of the side walls toward the step portion, and a rib connecting portion that interconnects the first rib portion and the second rib portion in a vehicle front-rear direction.

In the vehicle back door structure of the second aspect of the present invention, the first rib portion and the second rib portion are interconnected by the rib connecting portion, so loads are transmitted between the first rib portion and the second rib portion via the rib connecting portion. Because of this, loads can be transmitted from one side wall to the other side wall.

A vehicle back door structure of a third aspect of the present invention is the vehicle back door structure of the first or second aspect, wherein a plurality of reinforcement ribs are disposed at different angles along the peripheral edge of the back door panel.

In the vehicle back door structure of the third aspect of the present invention, the plural reinforcement ribs are disposed at different angles along the peripheral edge of the back door panel, so rigidity with respect to loads acting in the vehicle front-rear direction, the vehicle width direction, and the vehicle up and down direction can be improved. Furthermore, the torsional rigidity and the bending rigidity of the peripheral edge of the back door panel can be improved compared to a configuration where the plural reinforcement ribs are placed in only one direction.

A vehicle back door structure of a fourth aspect of the present invention is the vehicle back door structure of any one of the first to third aspects, wherein each reinforcement rib extends in a direction that slopes relative to a direction orthogonal to the bottom wall.

In the vehicle back door structure of the fourth aspect of the present invention, compared to a configuration where the reinforcement rib extends in a direction orthogonal to the bottom wall, even in a case where the height from the bottom wall is the same, the length of the reinforcement rib from its base to its distal end can be lengthened. Because of this, the area of the reinforcement rib can be increased and the rigidity of the peripheral edge of the back door panel can be effectively improved.

A vehicle back door structure of a fifth aspect of the present invention is the vehicle back door structure of any one of the first to fourth aspects, wherein the back door panel is equipped with a curved portion that is curved so as to be rounded toward a vehicle rear side, and each reinforcement rib is placed at least at the curved portion.

In the vehicle back door structure of the fifth aspect of the present invention, the bending rigidity of the curved portion can be ensured. Because of this, for example, even in a case where bending loads act on the curved portion when the vehicle back door is opened and closed, deformation of the curved portion can be controlled.

As described above, according to the vehicle back door structure pertaining to the present invention, the rigidity of the back door can be ensured while at the same time a reduction in weight is achieved.

BRIEF DESCRIPTION OF THE DRAWINGS

An exemplary embodiment of the present invention will be described in detail based on the following figures, wherein:

FIG. 2 is a rear view, seen from the vehicle rear side, of the door inner panel to which the vehicle back door structure pertaining to the embodiment has been applied;

FIG. 3 is an enlarged view showing relevant parts of FIG. 2; and

FIG. 4 is an enlarged sectional view showing a cross section cut along line 4-4 of FIG. 3, and is a view in a state in which the back door is closed.

DETAILED DESCRIPTION

Figure 1:
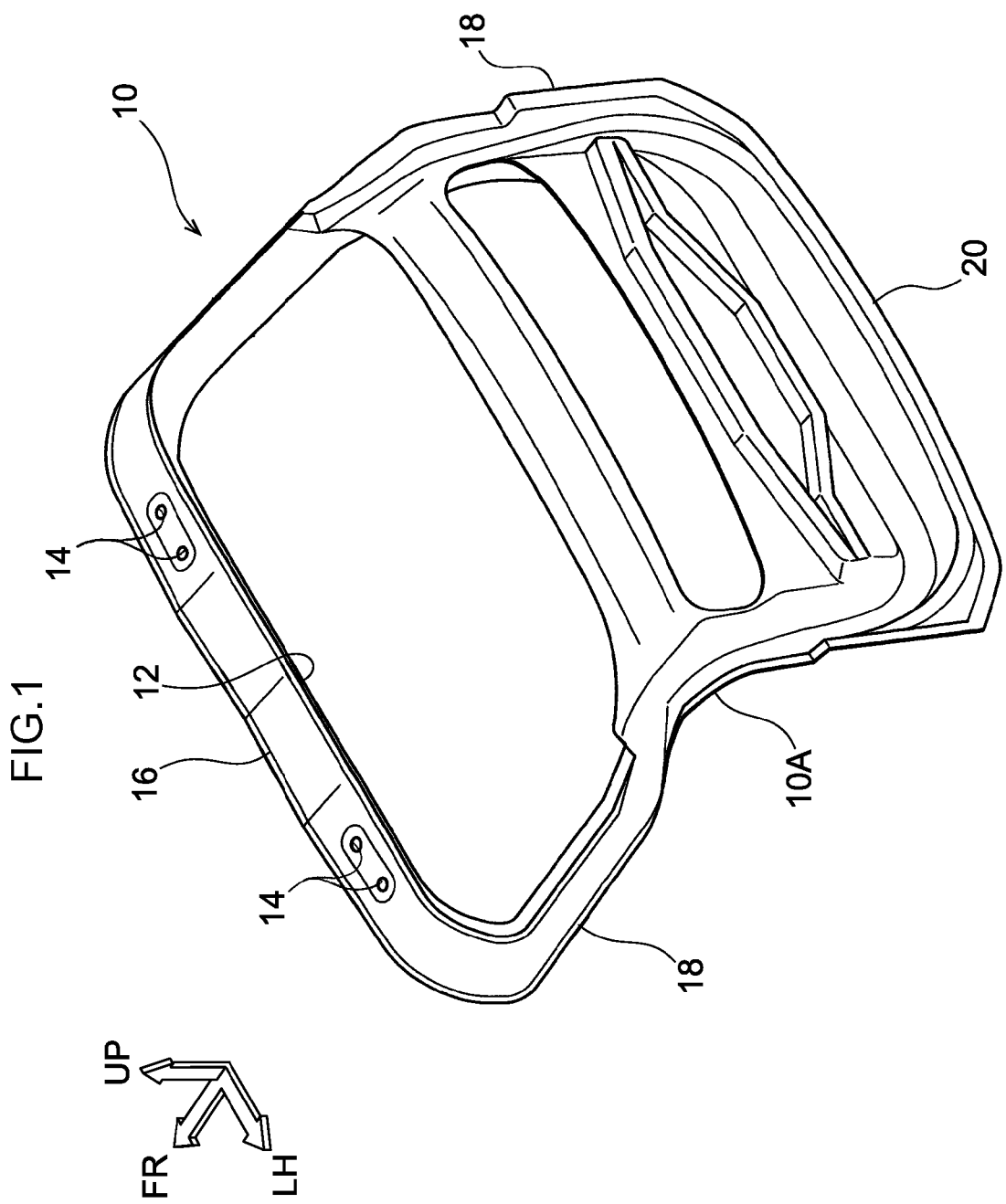
FIG. 1 is a perspective view, seen obliquely from a vehicle left and rear side, of a door inner panel to which a vehicle back door structure pertaining to the embodiment has been applied.

A vehicle back door structure pertaining to an embodiment will be described below on the basis of the drawings. Arrow FR appropriately shown in the drawings indicates a vehicle front side of a hatchback type vehicle to which the back door structure of the present embodiment has been applied, arrow UP indicates a vehicle upper side, and arrow LH indicates a vehicle left side. Furthermore, unless otherwise noted, when the directions of front and rear, up and down, and right and left are used in the following description, these will be understood to mean front and rear in the vehicle front-rear direction, up and down in the vehicle up and down direction, and right and left in the vehicle right and left direction (the vehicle width direction).

(Overall Configuration of Vehicle Back Door Structure)

As shown in FIG. 1, a vehicle resin back door structure of the present embodiment is configured to include a door inner panel 10 made of resin serving as a back door panel. The door inner panel 10 is, for example, molded of a carbon fiber-reinforced resin material (CFRP) and is equipped with a curved portion 10A at which the vehicle up and down direction middle portion of the door inner panel 10 is curved in such a way as to be rounded toward the vehicle rear side. Furthermore, the door inner panel 10 is sloped obliquely rearward heading from its upper end portion toward the curved portion 10A and extends toward the vehicle lower side heading from the curved portion 10A toward its lower end portion.

A substantially rectangular-shaped open portion 12 is formed in the portion of the door inner panel 10 above the curved portion 10A, and a back window glass 11 is attached to the open portion 12 (see FIG. 4). Furthermore, pairs of through holes 14 are formed in the right and left sides of an upper edge section 16 of the open portion 12, and non-illustrated brackets for fastening hinge portions by inserting bolts through the through holes 14 are attached to the upper edge section 16.

Furthermore, a non-illustrated door outer panel made of resin is joined from the vehicle outside to the upper edge section 16 and right and left side sections 18 of the open portion 12. The door outer panel is, for example, molded of a carbon fiber-reinforced resin material (CFRP) or TSOP (Toyota Super Olefin Polymer, which is a registered trademark; this is a thermoplastic resin whose main components are PP and EPDM). Additionally, the door outer panel is laid on, and joined by rivets or an adhesive to, the door inner panel 10 so that a closed cross section is configured.

Here, as shown in FIG. 2, plural reinforcement ribs 22, 24, and 26 are placed on at least part of the peripheral edge of the door inner panel 10 at different angles along the peripheral edge as seen in a rear view seen from the vehicle rear side. These reinforcement ribs 22, 24, and 26 will be described below.

(Configuration of Reinforcement Ribs)

The reinforcement ribs 22, 24, and 26 are plurally placed on the upper edge section 16 of the open portion 12, the side sections 18 including the curved portion 10A, and a lower end portion 20 of the door inner panel 10, respectively. The reinforcement ribs 22 placed on the upper edge section 16 of the open portion 12 are placed in regions excluding the vehicle width direction central portion of the upper edge section 16. Specifically, the plural reinforcement ribs 22 are placed in a zigzag shape in the vehicle width direction and are configured in such a way that substantially triangular shapes are formed by pairs of the reinforcement ribs 22 placed in substantially V-shapes and the wall surface of the upper edge section 16. "Zigzag shape" here is not limited to a structure where reinforcement ribs adjacent to each other along the peripheral edge of the back door panel are interconnected, and also includes a structure where spaces are disposed between adjacent reinforcement ribs.

The reinforcement ribs 26 placed on the lower end portion 20 of the door inner panel 10 are plurally placed in regions excluding the vehicle width direction central portion of the lower end portion 20. Specifically, the reinforcement ribs 26 are placed in a zigzag shape in the vehicle width direction and are configured in such a way that substantially triangular shapes are formed by pairs of the reinforcement ribs 26 placed in substantially V-shapes and the wall surface of the lower end portion 20. Furthermore, the reinforcement ribs 26 are placed as far as the neighborhoods of the side sections 18.

The reinforcement ribs 24 placed on the side sections 18 are plurally placed ranging from above the curved portion 10A to the lower end portion of the door inner panel 10. Furthermore, the plural reinforcement ribs 24 are placed in a recessed portion 28 formed along the peripheral edge of the door inner panel 10. In the following description the reinforcement ribs 24 formed on the side sections 18, which are the characteristic parts of the present invention, will be described. Furthermore, the reinforcement ribs 24 formed on the side section 18 on the vehicle right side and the reinforcement ribs 24 formed on the side section 18 on the vehicle left side are formed in such a way as to be bilaterally symmetrical, so in the following description the reinforcement ribs 24 formed on the side section 18 on the vehicle left side will be described.

As shown in FIG. 3 and FIG. 4, the recessed portion 28 in which the reinforcement ribs 24 are formed is equipped with a pair of side walls 30 and 32 and a bottom wall 34 that interconnects the vehicle front sides of the side wall 30 and the side wall 32. Additionally, the reinforcement ribs 24 are integrally formed on the vehicle rear side surface of the bottom wall 34 and bridge the side wall 30 and the side wall 32 in plural places. Furthermore, as shown in FIG. 3, the plural reinforcement ribs 24 are placed at different angles along the peripheral edge of the door inner panel 10 and are placed in such a way that substantially triangular shapes are formed by adjacent pairs of the reinforcement ribs 24 and the side wall 30 (32). Here, in the present embodiment, the reinforcement ribs 24 adjacent to each other along the peripheral edge of the door inner panel 10 are not interconnected. That is, among each two reinforcement ribs 24 adjacent to each other, a slight space is disposed between the portion where one reinforcement rib 24 and the side wall 30 (32) are interconnected and the portion where the other reinforcement rib 24 and the side wall 30 (32) are interconnected. However, the reinforcement ribs 24 are not limited to this and may also be configured in such a way that, by interconnecting the end portions of the adjacent reinforcement ribs 24, they form a continuous zigzag shape.

As shown in FIG. 4, the side wall 30 on the vehicle width direction outside (the vehicle left side) of the door inner panel 10 is sloped inward in the vehicle width direction heading from the vehicle rear side toward the vehicle front side. Furthermore, a flange portion 30A extends outward in the vehicle width direction from the vehicle rear side end portion of the side wall 30, and the back window glass 11 is joined via an adhesive 38 to the flange portion 30A.

The side wall 32 on the vehicle width direction inside of the door inner panel 10 is sloped outward in the vehicle width direction heading from the vehicle rear side toward the vehicle front side. Moreover, the vehicle front side end portion of the side wall 30 and the vehicle front side end portion of the side wall 32 are interconnected in the vehicle width direction by the bottom wall 34.

Furthermore, a step portion 34A is formed in the vehicle width direction central portion of the bottom wall 34, and due to this step portion 34A the side wall 30 side of the bottom wall 34 is positioned on the vehicle rear side of the side wall 32 side. Specifically, the distance from an outside bottom wall portion 34B on the vehicle width direction outside of the step portion 34A to the opening in the recessed portion 28 is shorter than the distance from an inside bottom wall portion 34C on the vehicle width direction inside of the step portion 34A to the opening in the recessed portion 28. That is, the outside bottom wall portion 34B is formed in a shallower position than the inside bottom wall portion 34C. Furthermore, in a state in which the back door is closed, a weatherstrip 102 attached to a vehicle body 100 is in contact with the vehicle front side surface of the outside bottom wall portion 34B.

Here, the reinforcement ribs 24 are formed of resin integrally with the door inner panel 10, straddle the step portion 34A, and bridge the side wall 30 and the side wall 32. Specifically, each reinforcement rib 24 is equipped with a first rib portion 24A, which is disposed on the outside bottom wall portion 34B and extends from the one side wall 30 toward the step portion 34A, and a second rib portion 24B, which is disposed on the inside bottom wall portion 34C and extends from the other side wall 32 toward the step portion 34A. Furthermore, a rib connecting portion 24C extends in the vehicle front-rear direction along the step portion 34A, and the first rib portion 24A and the second rib portion 24B are interconnected by the rib connecting portion 24C. For this reason, each reinforcement rib 24 is formed in a substantially crank-like shape as seen from the vehicle rear side.

Furthermore, as shown in FIG. 3, at least some of the reinforcement ribs 24 extend in a direction that slopes relative to a direction orthogonal to the bottom wall 34. Here, the reinforcement ribs 24 of the present embodiment extend in such a way that their distal end sides slope toward the vehicle lower side relative to a direction (the vehicle front-rear direction) orthogonal to the bottom wall 34. For this reason, the length of the sloping reinforcement ribs 24 from their bases to their distal ends is longer compared to reinforcement ribs that extend in an orthogonal direction from the bottom wall 34 at the same height. That is, the areas of the reinforcement ribs 24 are large.

(Action and Effects)

Next, the action and effects of the vehicle back door structure pertaining to the present embodiment will be described.

As shown in FIG. 4, in the door inner panel 10 to which the vehicle back door structure pertaining to the present embodiment has been applied, the door inner panel 10 is formed of resin and so a reduction in the weight of the door inner panel 10 can be achieved.

Here, in a case where the door inner panel 10 is formed of resin, there is the concern that the peripheral edge of the door inner panel will become deformed by a load acting from the weatherstrip 102, for example, in a state in which the back door is closed. In the vehicle back door structure of the present embodiment, the rigidity of the peripheral edge of the door inner panel 10 is ensured because the side wall 30 and the side wall 32 that configure the recessed portion 28 are bridged by the reinforcement ribs 24. Because of this, the peripheral edge of the door inner panel 10 can be kept from becoming deformed even in a case where a load acts from the weatherstrip 102.

Furthermore, when molding the door inner panel 10 with resin, the door inner panel 10 tends to become deformed in a direction in which the distance between the side wall 30 and the side wall 32 shrinks due to thermal contraction during the molding, but deformation caused by thermal contraction can be controlled because the reinforcement ribs 24 push back against and support the side walls 30 and 32.

Moreover, the reinforcement ribs 24 can be molded of resin integrally with the door inner panel 10. Because of this, a reduction in weight can be achieved compared to a configuration where a separate reinforcement member made of metal is attached. Furthermore, the number of parts can be reduced.

Furthermore, in a case where the height of the step portion 34A is large like in the present embodiment, sometimes the distal end portions of the second rib portions 24B disposed on the inside bottom wall portion 34C do not reach as far as the outside bottom wall portion 34B. Even in such a case as this, because the first rib portions 24A on the outside bottom wall portion 34B and the second rib portions 24B on the inside bottom wall portion 34C are interconnected by the rib connecting portions 24C, loads can be transmitted between the first rib portions 24A and the second rib portions 24B via the rib connecting portions 24C.

Moreover, in the present embodiment, as shown in FIG. 3, the reinforcement ribs 24 are placed in a zigzag shape as seen from the vehicle rear side. Because of this, rigidity with respect to loads acting in the vehicle front-rear direction, the vehicle width direction, and the vehicle up and down direction can be improved. That is, in a case where all the reinforcement ribs 24 are placed in the vehicle width direction between the side wall 30 and the side wall 32, sometimes sufficient rigidity cannot be ensured with respect to loads acting in the vehicle front-rear direction and the vehicle up and down direction. Therefore, by placing the reinforcement ribs 24 in a zigzag shape, rigidity with respect to a load acting in the vehicle width direction can be ensured while at the same time rigidity with respect to loads acting in the vehicle front-rear direction and the vehicle up and down direction can also be ensured. Because of this, the torsional rigidity and the bending rigidity of the peripheral edge of the door inner panel 10 can be improved.

Here, in the present embodiment, the curved portion 10A is disposed in the door inner panel 10, and it is easy for bending loads to act on the curved portion 10A when the back door is opened and closed (see FIG. 1). That is, when the lower end portion 20 of the door inner panel 10 is held to close the back door from a state in which the back door is open, it is easy for the load to concentrate in the curved portion 10A. Even in such a structure as this, the bending rigidity of the curved portion 10A can be ensured by the reinforcement ribs 24 placed in the curved portion 10A, and the curved portion 10A can be kept from becoming deformed when the back door is opened and closed.

Furthermore, in the present embodiment, at least some of the reinforcement ribs 24 extend in a direction that slopes relative to a direction orthogonal to the bottom wall 34. Because of this, the areas of the reinforcement ribs 24 can be enlarged compared to reinforcement ribs that extend in an orthogonal direction from the bottom wall 34 at the same height, and the rigidity of the door inner panel 10 can be effectively improved.

An embodiment of the present invention has been described above, but the present invention is not limited to this embodiment and can be implemented in a variety of ways without departing from the spirit of the present invention. For example, in the present embodiment, as shown in FIG. 2, in the upper edge section 16 of the open portion 12 and the lower end portion 20 of the door inner panel 10, the step portion 34A is not formed in the bottom wall 34 of the recessed portion 28 like it is in the side sections 18, but the present invention is not limited to this. That is, a step portion may also be disposed in the upper edge section 16 and the reinforcement ribs 22 may also be placed straddling this step portion. Furthermore, a step portion may also be disposed in the lower end portion 20 and the reinforcement ribs 26 may also be disposed straddling this step portion.

Furthermore, in the present embodiment, as shown in FIG. 4, the step portion 34A is formed in such a way that the side wall 30 side on the vehicle width direction outside of the bottom wall 34 is positioned on the vehicle rear side of the side wall 32 side on the vehicle width direction inside, but the present invention is not limited to this. For example the present invention may also be applied to a configuration where the step portion is formed in such a way that the side wall side on the vehicle width direction outside is positioned on the vehicle front side of the side wall side on the vehicle width direction inside. Moreover, in the present embodiment, the reinforcement ribs 24 are placed on only the peripheral edge of the door inner panel 10, but the present invention is not limited to this. For example, the same reinforcement ribs may also be placed on a lower edge section 36 of the open portion 12.

Furthermore, in the present embodiment, all the reinforcement ribs 24 are placed in a zigzag shape, but the present invention is not limited to this. For example, the present invention may also be given a configuration where the reinforcement ribs 24 in the curved portion 10A of the side sections 18 are placed in a zigzag shape and the reinforcement ribs 24 in other sections are placed along the vehicle width direction.

Moreover, in the present embodiment, the reinforcement ribs 24 are placed in the door inner panel 10, but the present invention is not limited to this and may also be given a configuration where reinforcement ribs that are the same as the reinforcement ribs 24 are placed on the door outer panel side.

What is claimed is:

1. A vehicle back door structure comprising:
    a back door panel made of resin having, in at least a part of a peripheral edge thereof, a recessed portion equipped with a pair of side walls and a bottom wall that interconnects vehicle front sides of the pair of side walls, with a step portion, that has one side-wall side positioned at a vehicle rear side of another side-wall side, being formed in the bottom wall; and
    a reinforcement rib that is formed integrally with a vehicle rear side surface of the bottom wall, that straddles the step portion, and that bridges the pair of side walls,
    wherein the reinforcement rib is configured to include a first rib portion that extends from one of the side walls toward the step portion, a second rib portion that extends from the other of the side walls toward the step portion, and a rib connecting portion that interconnects the first rib portion and the second rib portion in a vehicle front-rear direction.

2. The vehicle back door structure according to claim 1, wherein a plurality of reinforcement ribs are disposed at different angles along the peripheral edge of the back door panel.

3. The vehicle back door structure according to claim 1, wherein each reinforcement rib extends in a direction that slopes relative to a vehicle front-rear direction orthogonal to the bottom wall.

4. The vehicle back door structure according to claim 1, wherein
    the back door panel is equipped with a curved portion that is curved so as to be rounded toward a vehicle rear side, and
    each reinforcement rib is placed at least at the curved portion.

* * * * *